US006826672B1

(12) United States Patent
Brown et al.

(10) Patent No.: US 6,826,672 B1
(45) Date of Patent: Nov. 30, 2004

(54) CAPABILITY ADDRESSING WITH TIGHT OBJECT BOUNDS

(75) Inventors: Jeremy H. Brown, Somerville, MA (US); Thomas F. Knight, Jr., Belmont, MA (US); Jeffrey P. Grossman, Cambridge, MA (US); Andrew W. Huang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 61 days.

(21) Appl. No.: 09/855,875

(22) Filed: May 15, 2001

Related U.S. Application Data (60) Provisional application No. 60/281,087, filed on Apr. 3, 2001, and provisional application No. 60/204,872, filed on May 16, 2000.

(51) Int. Cl.[7] ............................................. G06F 12/00
(52) U.S. Cl. ..................... 711/220; 711/200; 711/202; 711/163
(58) Field of Search ......................... 711/220, 200, 711/202, 163, 203, 152

(56) References Cited

U.S. PATENT DOCUMENTS

| | | | | |
|---|---|---|---|---|
| 5,832,299 A | * | 11/1998 | Wooten | ...................... 395/829 |
| 5,845,331 A | * | 12/1998 | Carter | ...................... 711/163 |
| 5,953,522 A | * | 9/1999 | Fox | ............................... 395/681 |
| 5,956,751 A | * | 9/1999 | Lai | .............................. 711/172 |
| 6,480,845 B1 | * | 11/2002 | Egolf et al. | ..................... 707/6 |

OTHER PUBLICATIONS

Fabry, "Capability–Based Addressing", Jul., 1974, Communications of the ACM, vol. 17, No. 7.*
Bishop, Peter B., "Computer Systems with a Very Large Address Space and Garbage Collection," Massachusetts Institute of Technology, Laboratory for Computer Science, Cambridge, MA, May 1977, pp. 1–276.

* cited by examiner

*Primary Examiner*—Kimberly McLean-Mayo
(74) *Attorney, Agent, or Firm*—Hamilton, Brook, Smith & Reynolds, P.C.

(57) ABSTRACT

A pointer representation includes a permission field to define capabilities of the system in processing the data to which an address in the pointer of representation points. Bounds of the memory segment to which the capabilities apply are defined by a block field, which defines a block size, and a length field, which defines a number of blocks of that size within the segment of memory. To permit computation of the full range of addresses to which the capability applies, a finger field is included to denote the block of the segment of memory to which the address points. An increment-only bit may cause the system to preclude any negative offsets from the address in the pointer representation. Subsegments within a segment may be further defined by additional block, length and finger fields.

12 Claims, 7 Drawing Sheets

CAPABILITY ADDRESSING WITH TIGHT OBJECT BOUNDS

RELATED APPLICATION(S)

This application claims the benefit of U.S. Provisional Application Nos. 60/281,087, filed on Apr. 3, 2001 and Ser. No. 60/204,872, filed on May 16, 2000.

The entire teachings of the above applications are incorporated herein by reference.

GOVERNMENT SUPPORT

The invention was supported, in whole or in part, by a grant Contract No. F30602-98-1-0172 from Air Force Research Lab. The Government has certain rights in the invention.

BACKGROUND OF THE INVENTION

Since the advent of computers capable of running several programs concurrently, data security has been an important issue in system design. When different programs share the same hardware resources it is essential to ensure that they are not able to access or alter each other's data unless sharing is explicitly allowed by the programmer. Data security within a single program is also desirable to the developer, as it eliminates potential sources of program errors.

Traditionally, inter-process security has been addressed by maintaining a per-process page-table providing a translation from virtual address to physical location. This gives each process a separate address space and allows the operating system to ensure that it is impossible for data of a process to be inspected or corrupted by other applications. While such an approach is functional, there are three main objections to it. First, a process dependent address translation mechanism dramatically increases the amount of processor state associated with a given process. This makes context switching correspondingly slower, thus increasing system overhead and reducing efficiency. Second, data can only be shared between processes at the page granularity. Finally, this mechanism does not provide security within a single context; a program is free to create and use invalid pointers.

The idea of using capabilities for addressing first appeared formally in a paper by Jack B. Dennis, Earl C. Van Horn, "Programming Semantics for Multiprogrammed Computations," Communications of the ACM, Vol. 9, No. 3, March 1966, pp. 143–155, and further developed by R. S. Fabry, "Capability-based addressing, Communications of the ACM," 17(7):403–12, July 1974. In concept, each capability specifies a segment of memory and a set of permissions detailing the operations permitted upon that region. Fabry's scheme represents each capability as a set of permissions and a segment-identifying unique ID. A hash table keyed on UIDs contains segment base and bounds information; a small associative cache preserves mappings for the most recently accessed segments. Fabry's approach is thus efficient when using small numbers of segments but inappropriate to a system in which every independently-allocated object is placed in its own segment.

A number of early capability systems used centralized tables mapping from capabilities to segment addresses; several are described in Henry M. Levy, "Capability-based computer systems," Digital Press, 1984. While some of these machines segregate non-capability data from capabilities in distinct segments, the evolutionary trend is clearly toward tagging capabilities in a hardware-recognizable fashion so that they may be freely intermingled with other data.

Most modern capability systems have avoided the centralized table by embedding object addresses directly in the capability representation. We will not attempt to list them all here, but rather to provide a small number of examples representing keypoints in the design spectrum.

In the ORSLA capability-system described in Peter B. Bishop. "Computer Systems With A Very Large Address Space and Garbage Collection," PhD thesis, Massachusetts Institute of Technology, May 1977 a capability contains permissions bit, the address of the first word of an object, and a small size field (5–9 bits). With each memory reference, an offset is added to the base address in the capability.

The first bit of the size filed distinguishes small and large objects. For small objects, the remaining bits simply represent the size in words. For large objects, the remaining bits are divided into exponent and mantissa components, the exponent defining a block size and the mantissa defining a number of blocks in a segment. This floating-point number can describe (at coarser granularities) much larger segments than can an integer represented with the sane number of bits. Rather than setting the value of the size field to be slightly larger than the number of words in the contained object, ORSLA sets it to be slightly smaller; the object's precise size is stored in the object itself. When a reference to the last few words of a large object violates the capability's size field, microcode performs additional memory references to check the precise size stored in the object.

This scheme gives ORSLA precise object bounds at the cost of an extra memory reference for words toward the end of an object. Object allocation is extremely easy in ORSLA—objects may be allocated consecutively by simply advancing a shared allocation pointer.

The Symbolics 3600 Lisp Machine architecture (David A. Moon, "Architecture of the symbolic 3600," 12th Annual International Symposium on Computer Architecture Conference Proceedings, pages 76–83, 1985) features per-object pointers which directly reference the first word of their target objects. Rather than encoding bounds information in these pointers, however, the object size is encoded in the object's first word; performing bounds-checking on object references requires an extra memory reference. Note, since a Symbolics pointer contains no permissions bits, it is a fairly degenerate form of "capability"—possession of a pointer implies permission to perform any and all operations on its target object.

The M-machine (Marco Fillo, Stephen W. Keckler, William J. Dally, Nicholas P. Carter, Andrew Change, Yevgeny Gurevich and Whay S. Lee, "The m-machine multicomputer," in Proc. 28th Annual International Symposium on Microarchitecture, pages 146–156, 1995) uses a guarded pointer format (described in Nicholas P. Carter, Stephen W. Keckler and William J. Dally, "Hardware support for fast capability-based addressing," in Proceedings of the 6th International Conference on Architectural Support for Programming Languages and Operating Systems (ASPLOS VI), pages 319–27, October 1994 and U.S. Pat. No. 5,845,331, which are incorporated by reference in their entireties) to encode permissions, an address, and a segment length descriptor L. The upper bits of the address are fixed, while the lower L bits are mutable by pointer arithmetic; the segment is thus of size and alignment $2^L$, and the capability may point to any address within it. The base address of a segment may be computed by simply setting the L tower bits to zero, and a user stays within the defined segment so long as the base bits remain unchanged. This scheme requires hardware-recognized (i.e., tagged) capabilities and a small amount of hardware support in the processor to verify bounds information in parallel with performing pointer arithmetic. Notably, it requires neither indirections through a central table, nor the embedding of size information in an object representation.

SUMMARY OF THE INVENTION

Two disadvantages of the M-machine approach both arise from the exponentiated segment sizes. First, for an object only slightly larger than some power of two, nearly half of the segment allocated to hold it will be unused; this internal fragmentation both wastes space and means that accesses which overrun the end of the object will not immediately be detected as they will still fall into the segment. Second, due to the strict alignment requirement, a simple allocation strategy based on advancing a pointer may wind up wasting nearly half of memory due to external fragmentation.

In accordance with the present invention, those disadvantages are reduced by defining a memory segment by a block size and a number of blocks in the segment. An index into the memory segment, which identifies the block to which an address of the pointer points, is also included in the pointer representation in order to allow computation of the full bounds of the segment relative to the pointed-to address.

In accordance with one aspect of the invention, a pointer representation within a data processing system comprises a block field which defines a block size and a length field which defines a number of blocks in a segment of memory. An address in the representation points into the segment of memory. A finger field denotes a block of the segment of memory into which the address points.

The pointer representation may further include a permission field which indicates how a process may access data within the segment of memory. A capability field may identify the pointer representation as a capability pointer having bounds and permission defined therein. The representation may bound the segment of memory to the number of blocks indicated by the length field, each block of size $2^B$ a where B is a value defined in the block field.

A base address may be computed from the address in the pointer representation by setting the B least significant bits of the address equal to zero, where B is the block a size, and subtracting a block index indicated by the finger field from the base bits of the address, excluding the B least significant bits.

In order to reduce the required number of bits, the length field may be encoded such that the number of blocks is indicated by adding a defined constant to the value in the length field for all but the smallest range of numbers and the smallest block size.

The pointer representation may further include an increment-only bit, the system excluding negative offsets to the address in the memory representation. The address of the pointer representation may then point to the base address of a memory region within the segment. All portions of the memory segment not within the memory region have addresses less than the address in the pointer representation.

A subsegment within the segment of memory may be defined by a memory representation which includes a block field, length field and finger field, respectively, for each of the segment of memory and the subsegment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Capability Representation

Our capability representation takes inspiration from both the M-machine's guarded pointers and ORSLA's floating-point-bounded capabilities. Our goal is to define a representation encoding both address and size information such that:

No memory references are ever required to check segment bounds.

The segment defined by a capability is not significantly larger than the contained object in order to avoid wasting memory.

The segment defined by a capability has loose alignment requirements in order to simplify allocation and thereby improve locality of reference.

A capability may contain an address pointing to any location in the segment it describes.

Figure 1:
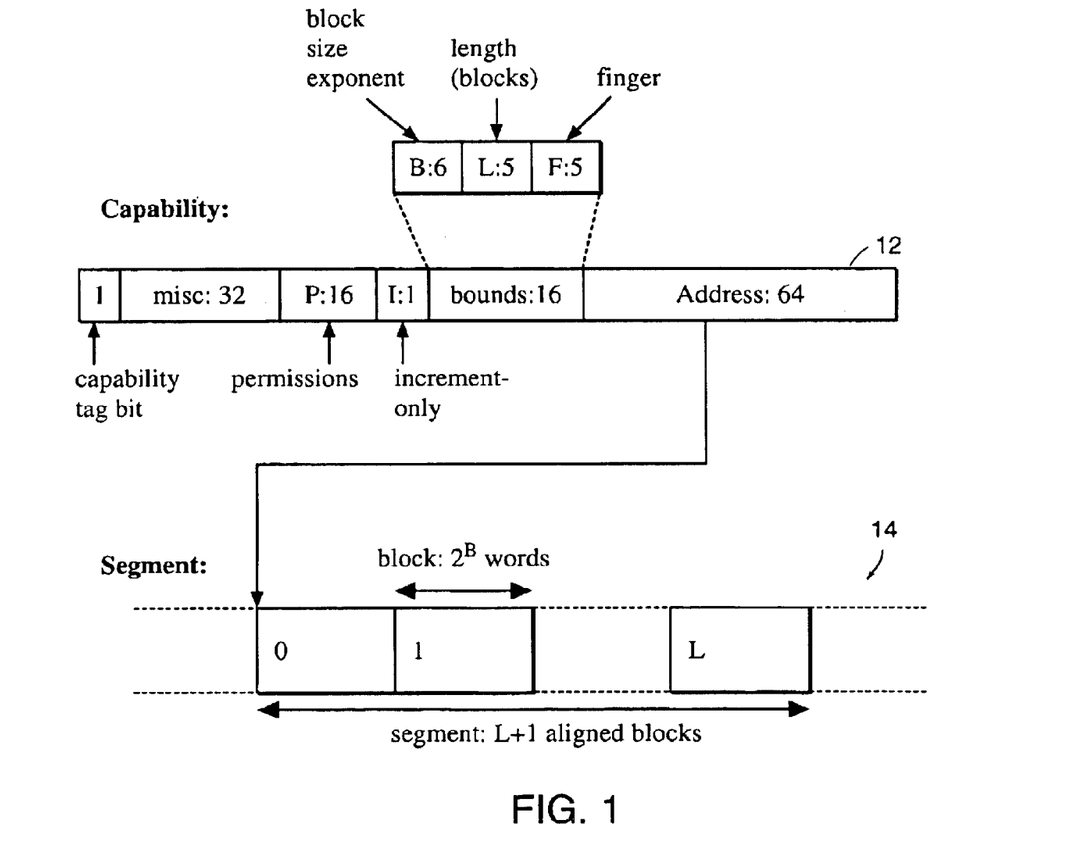
FIG. 1 illustrates a capability pointer data structure embodying the present invention.

Although numbers of bits are design choices, we propose a 128-bit capability shown in FIG. 1 composed of a 64-bit address field, a 15-bit bounds field, a 1-bit increment-only field, a 16-bit permissions field, and a 32-bit miscellaneous field available to the operating system; a special 129th capability tag bit distinguishes capabilities from other data. We will not discuss details of the permissions bits beyond mentioning that we favor the "diminish-take" scheme described in Jonathan Strauss Shapiro, "EROS: A capability System." PhD thesis, University of Pennsylvania, 1999, which is incorporated by reference in its entirety. In a later section, we will describe the increment-only field and the use of some of the miscellaneous bits to enable subsegmentation.

We begin by introducing a 16-bit bounds field; we will reduce it to 15 bits in a following section.

In FIG. 1, a capability pointer 12 stored in a register points to a segment 14 in memory. In the 16-bit version, shown in FIG. 1, a capability's bounds field is divided into subfields L, B and F; we shall defer discussion of the 5-bit finger field F. L and B together specify that the segment consists of L+1 blocks of $2^B$-word boundaries. (The size field may be viewed as a floating point number with mantissa L and exponent B, but this viewpoint obscures the block-alignment requirement.) We suggest 5 bits for length L and 6 bits for log-block-size B, in which case the bounds field is 16 bits and a segment may be as large as $2^5 * 2^{2^6-1} = 2^{68}$ words. In other words, we can describe a segment which is larger than our entire address space.

As with the M-machine guarded pointers, the address field can point to any location within the segment, so memory references can be made directly without adding an offset to a base pointer as required in the ORSLA system. Also as in the M-machine, the permissions which apply to the segment and the bounds of the segment are encoded in the guarded pointer. Using the bounds field, a machine can determine whether a user is attempting access beyond the permitted bounds. As a result, a common page-table can be used for all processes and thus flushing of the translation lookaside buffer (TLB) on process switch is no longer needed. Rather than relying on separate TLBs to separate users in different virtual spaces, the machine is able to prevent unauthorized access by checking the bounds indicated in the capability. As in the M-machine guarded pointers, a capability tag bit indicates whether the particular word is a pointer to which the following discussion applies.

The present guarded pointers are distinguished from those of the M-machine in the mechanism by which the segment boundaries are defined. In the M-machine, the length field L defined a segment of width $2^L$. A segment would be defined as the smallest segment $2^L$ which would meet the requirements of a particular data object. Unfortunately, the result was segments which were larger than required and memory space approaching one half the defined space would be wasted. In accordance with the present invention, segment boundaries are defined as in the ORSLA system by a number L of blocks of $2^B$ words. Because blocks of finer grain than the full segment can be defined, and wasted memory space is no more than one block, substantially less memory is wasted. In the present implementation which provides for up to 32 blocks in a segment, the wasted space approaches $1/16$ as compared to $1/2$ with the M-machine guarded pointer.

In practice, for maximum granularity, each segment is defined by the smallest possible block size. Table 1 presents, for ranges of object sizes, the values of B and L and the corresponding block size and range of lengths. Also presented is the segment size resulting from the choice of B and L.

TABLE 1

| OBJECT SIZE (BYTES) | B | BLOCK SIZE $2^B$ (BYTES) | L | NUMBER OF BLOCKS N = (L + 1) | SEGMENT SIZE N$2^B$ (BYTES) |
| --- | --- | --- | --- | --- | --- |
| 1–32 | 0 | 1 | 0–31 | 1–32 | 1–32 |
| 33–64 | 1 | 2 | 16–31 | 17–32 | 34–64 |
| 65–128 | 2 | 4 | 16–31 | 17–32 | 68–128 |
| 129–256 | 3 | 8 | 16–31 | 17–32 | 136–256 |
| . | . | . | . | . | . |
| . | . | . | . | . | . |
| . | . | . | . | . | . |

Note that for small objects sizes of 1–32 bytes, the segment size is able to exactly match the object size since the block size is itself one byte. For larger object sizes, larger block sizes are required. For an object of 33 bytes, 17 2-byte blocks are required with one byte of the final block wasted. Similarly, for a 65 byte object, 17 4-byte blocks are required with 3 bytes of the final block wasted.

Note that a 32-byte object could also be defined by B=1 and L=15 without waste. In fact, any segment whose size can be represented as $L_1$, $B_1$ where $B_1>0$ and $L_1<16$ can also be represented with finer granularity blocks as $L_2=(L_1 \cdot 2)+1$, $B_2=B_1-1$. However, by following the rule of using the smallest available block size, the amount of waste is minimized in all cases.

Note that another effect of following the rule is that, for $B \leq 1$, the values of L of 1–16 are unused. By requiring that sizes always be represented at the finest possible granularity, we can re-encode the size field as L',B', where L' is only 4 bits, thus saving one bit over the L, B representation.

Figure 2:
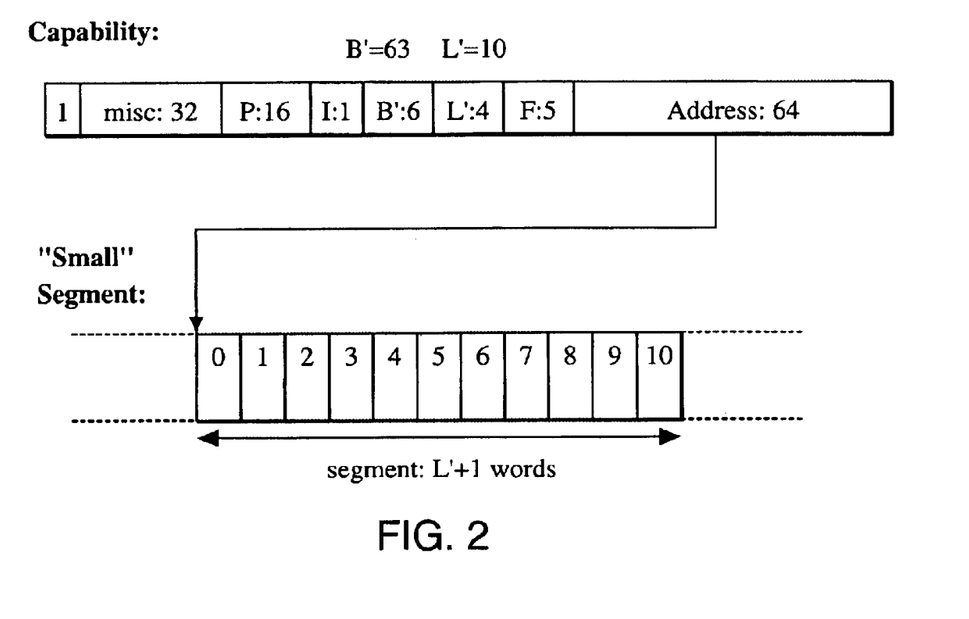
FIG. 2 illustrates an example of a pointer capability using a compressed-bounds format for a small segment.
Figure 3:
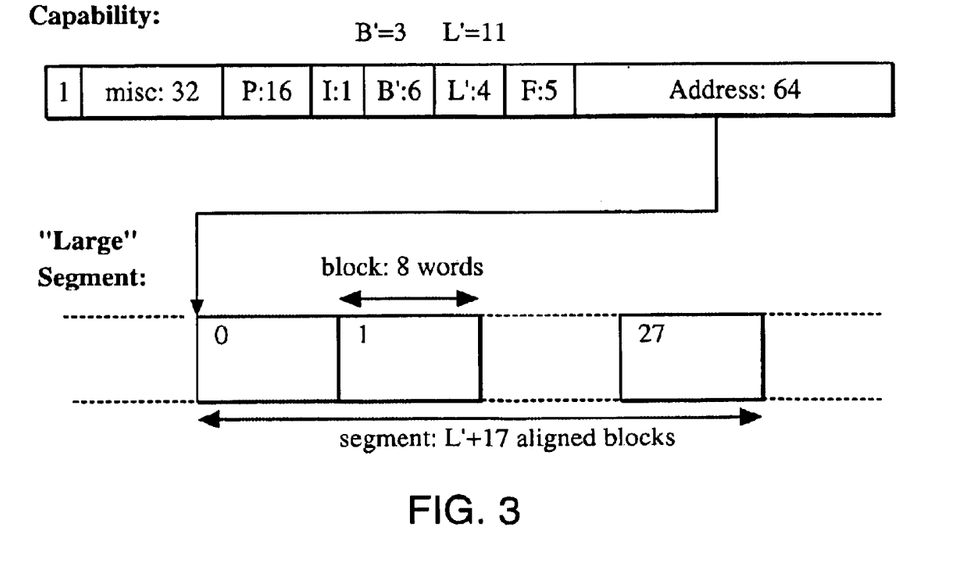
FIG. 3 illustrates a compressed bounds format capability pointer for a larger segment.

We split this compressed-bounds encoding into two cases: small segments, and large segments. A small segment is between 1 and 16 words, and is represented by setting B'=63 and taking L'+1 to be the size of the segment in words. For example, FIG. 2 shows a compressed-bounds format (128+1 bits) capability identifying an 11-word memory segment (B=0, L=10; B'=63, L'=10). A large segment consists of exactly L'+17 blocks of $2^{B'}$ words, where $0 \leq L' \leq 15$ and $0 \leq B' \leq 62$. For example, FIG. 3 shows a compressed-bounds format capability identifying a 224-word memory segment (B=3, L=27; B';=3, L'=11). With this encoding the largest segment representable is $2^{67}$ words. Table 2 shows the results of this encoding approach and can be compared to Table 1.

TABLE 2

| OBJECT SIZE (BYTES) | B | BLOCK SIZE $2^B$ (BYTES) | L' | NUMBER OF BLOCKS N | SEGMENT SIZE N$2^B$ (BYTES) |
| --- | --- | --- | --- | --- | --- |
| 1–16 | 63 | 1 | 0–15 | N = (L' + 1) 1–16 | 1–16 |
| 17–32 | 0 | 1 | 0–15 | N = (L' + 17) 17–32 | 17–32 |
| 33–64 | 1 | 2 | 0–15 | 17–32 | 34–64 |
| 65–128 | 2 | 4 | 0–15 | 17–32 | 68–128 |
| . | . | . | . | . | . |
| 129–256 | 3 | 8 | 0–15 | 17–32 | 136–256 |
| . | . | . | . | . | . |

The hardware to translate from compressed size to regular size is quite simple. If the ith bit of B' is $b'_i$, let $$S = (B' \neq 63)$$

$$= \overline{b'_5 \cdot b'_4 \cdot b'_3 \cdot b'_2 \cdot b'_1 \cdot b'_0};$$

we can compute s with a 6-input NAND gate.

Given s, B is easily calculated with six AND gates: $b_i = b'_i \cdot s$. Finally, no additional gates are necessary to compute L, which is represented simply with $l_5 = s$, and $l_1 = l'_i$ for $0 \leq i \leq 4$.

In the remainder of this discussion, we will generally speak in terms of B and L because they have simpler semantics than B' and L'. We will, however, always assume that segment sizes are represented at their finest possible granularities.

Although our "floating point" size representation clearly gives a better fit between segment and object sizes than a purely exponential representation, for objects of more than 32 words there is still the possibility that the segment will be larger than the object it contains; that is, one of the blocks of the segment will not be entirely covered by the object the segment contains. Large objects always have at least 17 locks, and less than one block is wasted, so the worst-case memory loss due to this internal fragmentation is less than $1/17$ (less than 5.9%). By adding bits to the mantissa L, we could further reduce the degree of waste; for instance, one additional bit would reduce internal fragmentation to less than 1/33 (about 3%.)

We have specified that the blocks of a segment must be block-aligned; that is, for a block of size $2^B$, the lower B bits of the address of the first word of the block must all be zero. We justify this requirement below, but we shall explore its implications for allocation here.

In particular, we would like to be able to allocate objects by simply advancing a counter on demand; this style of allocation is extremely simple and provides desirable spatial locality between consecutively allocated objects. Unfortunately, when a large object is allocated immediately following a small object, the last word of the small object may occupy a slot that would otherwise be the first word of a block for the large object. This forces the large object to be allocated at the next large block alignment boundary, wasting most of the large block preceding it. Since large segments consist of at least 17 blocks, at worst less than one block in 18 (less than 5.6%) is lost to this external fragmentation.

Combined with internal fragmentation due to object/segment size mismatches, the systemic worst-case space wastage is less than 2 blocks in 18, or less than 11.2% total wastage. Of course, like internal fragmentation, external fragmentation only wastes real memory up to the level of a page; again, though, our goal is to place each object in its own capability-guarded segment, and so we must still expect fragmentation to waste physical memory, since most objects will be too small to generate page-sized, page-aligned fragments. Specifically, an object must be more than 32 pages in length in order to potentially generate page-level fragmentation.

The Finger Field

With floating-point size representations, it is not possible to compute the base of a segment from an arbitrary address pointing into it; as a result, systems like ORSLA can only store capabilities which point to segment bases.

Figure 4:
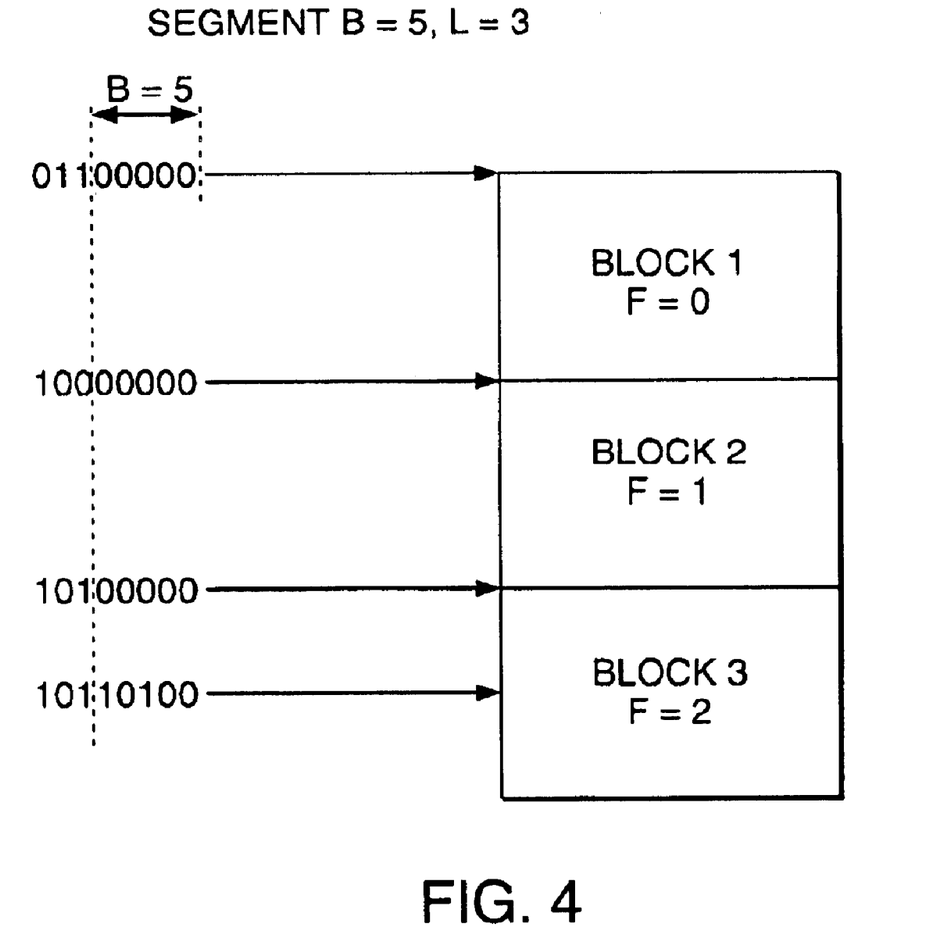
FIG. 4 illustrates the effect of setting B bits of an address to zero in a multiblock segment.

In the M-machine approach where a segment was defined by a single block of length $2^L$, the base address of the segment can be readily computed by setting the L least significant bits equal to zero. By contrast, with the present approach where a segment may comprise multiple blocks, each of size $2^B$, setting B bits to zero calculates the base address of a block, but not of the entire segment. Note the example of FIG. 4 where a segment base address is 01100000, B=5 and L=3. Consider an address 10110100 pointing into the third block of the segment. By setting the B least significant bits equal to zero one would only compute the base address 10100000 of the block. In this example, even setting the next bit equal to zero would only compute the base address of block 2.

Figure 5:
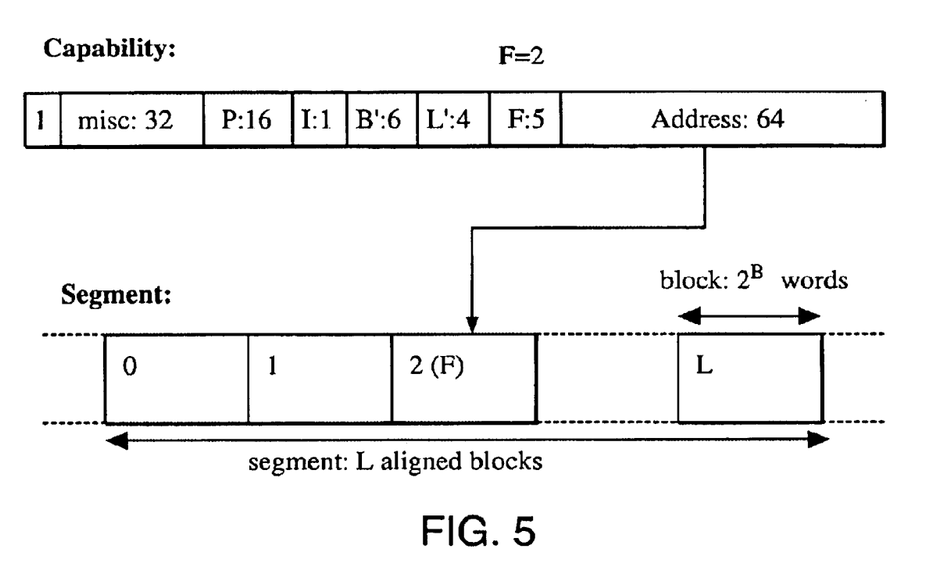
FIG. 5 illustrates the use of a finger field in a capability pointer embodying the present invention.

We overcome this limitation in our capability representation with the finger field F. The address in a capability may point to an arbitrary word in the target segment; as shown in FIG. 5, the finger field records the fact that the pointed-to word is contained in the $F^{th}$ block in the segment. Using our 5-bit size-field mantissa L (4-bit L'), an address can point into any of up to 32 blocks; F must therefore be 5 bits long.

Another way to view F is as the high bits of the offset of the capability's address A from the segment base S; i.e. if we decompose the 64-bit address A as $$A = U:Z \quad (1)$$

where size (Z)=B, we can exploit the fact that the segment is block-aligned to express A as $$A = S + F:Z \quad (2)$$

where the term F:Z is padded with leading 0's to match A's 64-bit length.

Figure 6:
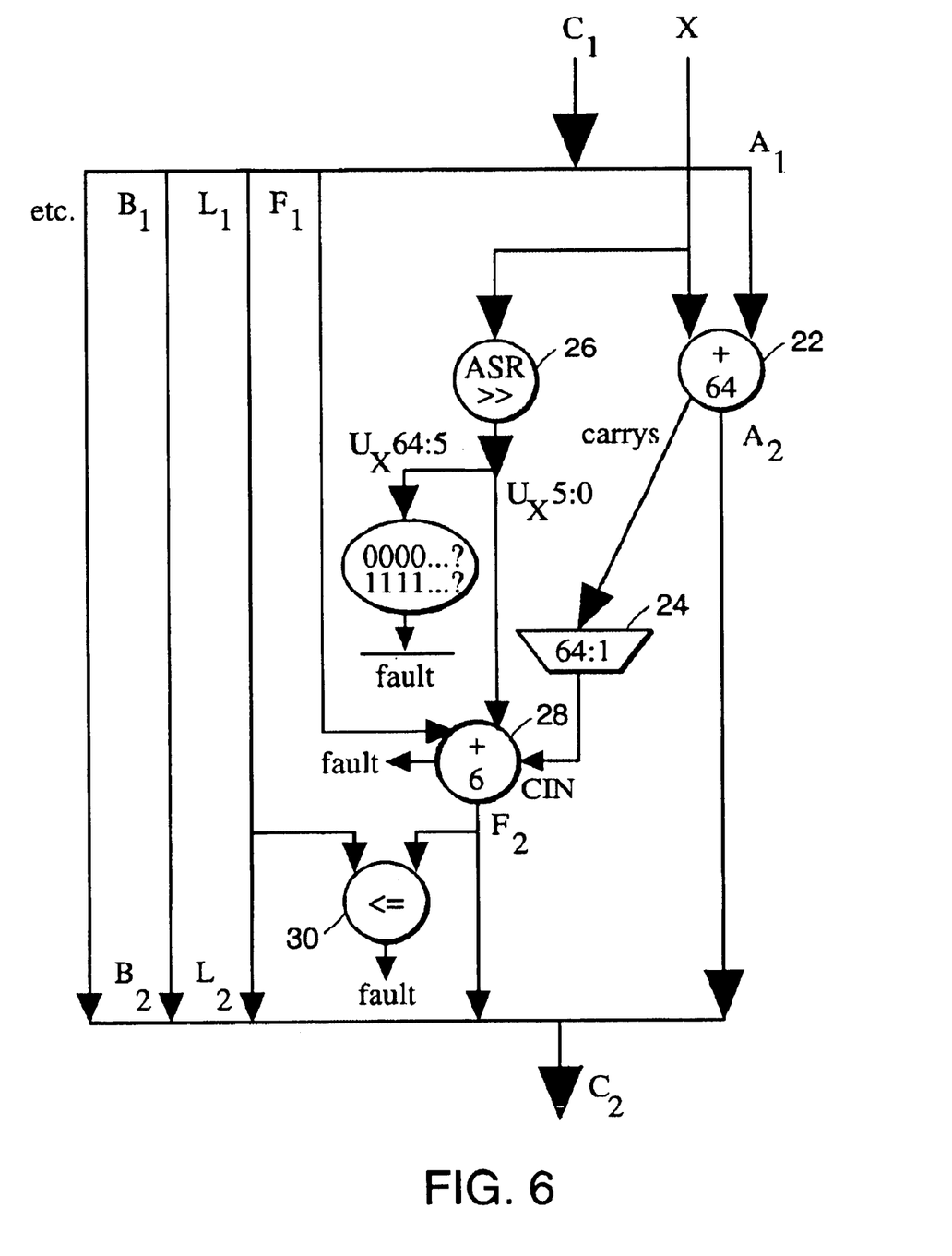
FIG. 6 illustrates the data path for adding a signed constant offset to a capability.

Using the finger field, we can add an arbitrary integer offset X, where $$X = U_x:Z_x \quad (3)$$

to a capability $C_1$ while simultaneously verifying that the address in the resulting capability $C_2$ still points within the segment bounds; note that X may be negative. The complete datapath for this operation is shown in FIG. 6; the explanation of the datapath follows.

We compute the new address $A_2$ in straightforward fashion using a 64-bit adder 22:

$$A_2 = A_1 + X \quad (4)$$

We can compute $F_2$ more efficiently than is immediately obvious. Using Equations 2 and 3, we can rewrite Equation 4 as $$A_2 = S + F_1:Z_1 + U_x:Z_x \quad (5)$$

If we subtract S from both sides of Equation 5, and right-shift the result by B bits, we discover that $$F_2 = F_1 + U_x + (Z_1 + Z_x) >> B \quad (6)$$

The last term of Equation 6 is simply the carry-bit resulting from adding the first B bits of $A_1$ and X. Thus, we can compute $F_2$ using a 64:1 multiplexor 24 to steal the correct carry bit, a 64-bit arithmetic right shift unit 26 to extract $U_x$ while preserving its sign, and a 64-bit adder 28 to sum $U_x$ and $F_1$.

As it turns out, we can actually replace the 64-bit adder with smaller quantities of hardware. We first observe that if $U_x$ is positive, it must be smaller than 32 or it is guaranteed to cause $F_2$ to be larger than L; if $U_x$ obeys this requirement, bits $u_i$ for $i \geq 5$ will all be 0. Similarly, if $U_x$ is negative, its magnitude can be at most 31 since otherwise $F_2$ is certain to be negative; if $U_x$ obeys this requirement, bits $u_i$ for $i \geq 5$ will all be 1.

Based on these observations, we can perform simple checks on the high bits of $U_x$ to ensure that they meet one or the other of these criteria; if they fail, a bounds-check interrupt is raised. To compute the valid-positive-value check requires a 64-input NOR; to compute the valid-negative-value check requires a 64-input AND.

If the checks on the high bits of $U_x$ pass, we can compute Equation 6 using only the 6 lowest bits (5 value bits and one sign bit) of $U_x$. Hence, we use a 64-bit AND, a 64-bit NOR, and a 6-bit adder, all instead of a 64-bit adder. Of course, if the result of the 6-bit addition generates a carry, we signal a bounds violation.

Having finally computed $F_2$, we now compare it to L with a 5-bit comparator 30. If $F_2 < 0$ or $F_2 \geq L$, there is a bounds violation and an interrupt must be signaled; if not, $A_2$ and $F_2$ are valid and may be composed, along with $B_1$ and $L_1$, to form the new capability $C_2$.

An important operation for garbage collection is quickly discovering an object's base address. If we subtract F:Z from both sides of Equation 2 to produce $$S = A - F:Z \quad (7)$$

we see that it is simple to compute a segment's base address using the pointer-math hardware of the previous section; we just subtract F:Z from A. Assembling F:Z in hardware requires a mask operation to extract Z from A; a shift operation to move F to the appropriate bitwise position; and finally an OR operation to merge the two values.

Increment-only Capabilities and Front-padded Allocation

Although our bounds on wasted space are fairly tight, segments will still sometimes be larger than the objects they contain. Because the bounds-checking hardware checks segment bounds rather than object bounds, languages such as Java which must precisely bounds-check array accesses are stuck performing software checks. We offer a solution to this problem: increment-only capabilities combined with front-padded allocation.

A single bit I is set to mark a capability as increment-only; if I is set, only positive offsets may be added to the capability. For example, a routine which receives an increment-only capability pointing to the middle of an array can only access the second half of that array; it cannot add negative offsets to the capability to access the first half.

Front-padded allocation simply means that when we allocate an object of size N into a segment of size M where M>N, the first word of the object is located at word M-N of the segment, causing the last word of the object to coincide with the last word of the segment. In other words, all of the wasted space (padding) is at the front of the segment, rather than at the end.

We can get precise bounds-checking on objects by using an allocator which returns increment-only capabilities to the first words of front-padded objects. This approach works perfectly for languages such as Java which only store pointers to the first words of objects and arrays. Obviously we can not use the increment-only bit with languages such as C that allow arbitrary pointer math; however, front-padded allocation still has the potential to be helpful since most loops move from the front to the end of an object (array), rather than vice-versa, and thus the danger of accidental bounds-overrun is greatest at the end of an object.

The increment-only check is easily performed in hardware simply by examining the high bit of any (signed) constant being added to a capability, and throwing an interrupt if it is 1.

Increment-only pointers may be useful in other applications. For instance, we can protect an object's "private" fields from broken or malevolent code by placing them at its head. When passing a capability to untrusted code, we pass an increment-only capability which points just after the private fields, thus giving access only to the public fields in the latter part of the object.

Sub-segmentation with Original Segment Recovery

In some cases, one might wish to allocate a large object, and then create a capability whose base and bounds information denote a sub-segment of that object; for instance, one might allocate an array of objects, and wish to generate a capability for exactly one of the objects in the array. Generating such a capability is trivial, subject to alignment requirements: in the new capability, the address points into the sub-segment, and the bounds information denotes the sub-segment's bounds.

Uncontrolled sub-segmentation can generate problems in the presence of segment relocations which may happen, for instance, due to compacting garbage collection. A garbage collector faced with a variety of capabilities which overlap to varying degrees would have a great deal of difficulty ensuring that each segment was copied exactly once with no duplication of sub-segments.

Figure 7:
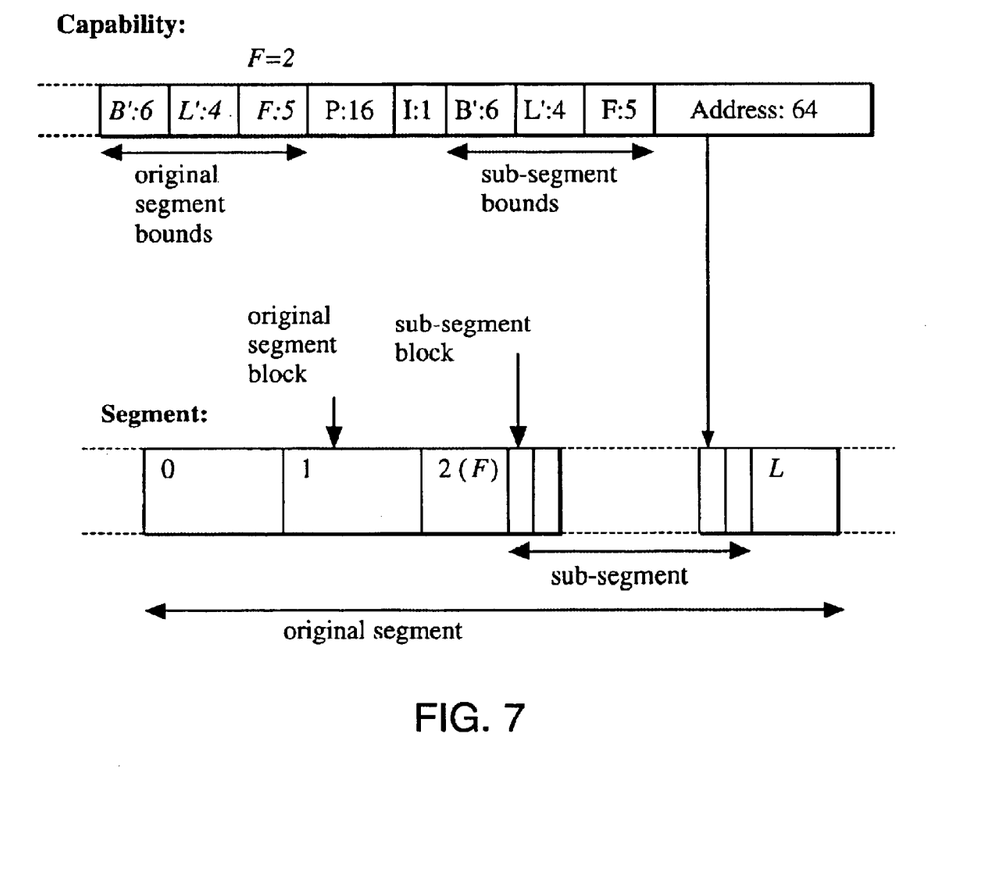
FIG. 7 illustrates a capability pointer which defines a subsegment within a segment.

To solve this problem we adopt a simple strategy: when a sub-segment capability is generated, its bounds are presented in the B, L and F fields, and the bounds information for the original segment are stored into some of the previously unused miscellaneous bits in the capability as shown in FIG. 7. In particular, the original segment's size fields B' and L' are preserved; the finger F which is preserved identifies the original block in which the sub-segment begins. Thus, given a sub-segment capability, privileged routines such as the garbage collector can generate a capability for the original segment by first finding the base of the sub-segment, and then using the stored bounds information to recover the base and size of the original segment.

Either a tag bit must be dedicated to distinguish sub-segment capabilities from normal capabilities, or else normal capabilities must include copies of their size information in the "original bounds" fields so that garbage collection routines may treat all capabilities uniformly. Regardless, no special hardware is required to employ sub-segmentation; the operating system, allocation, and garbage-collection routines must simply agree upon the convention.

Hardware Implementation

Figure 8:
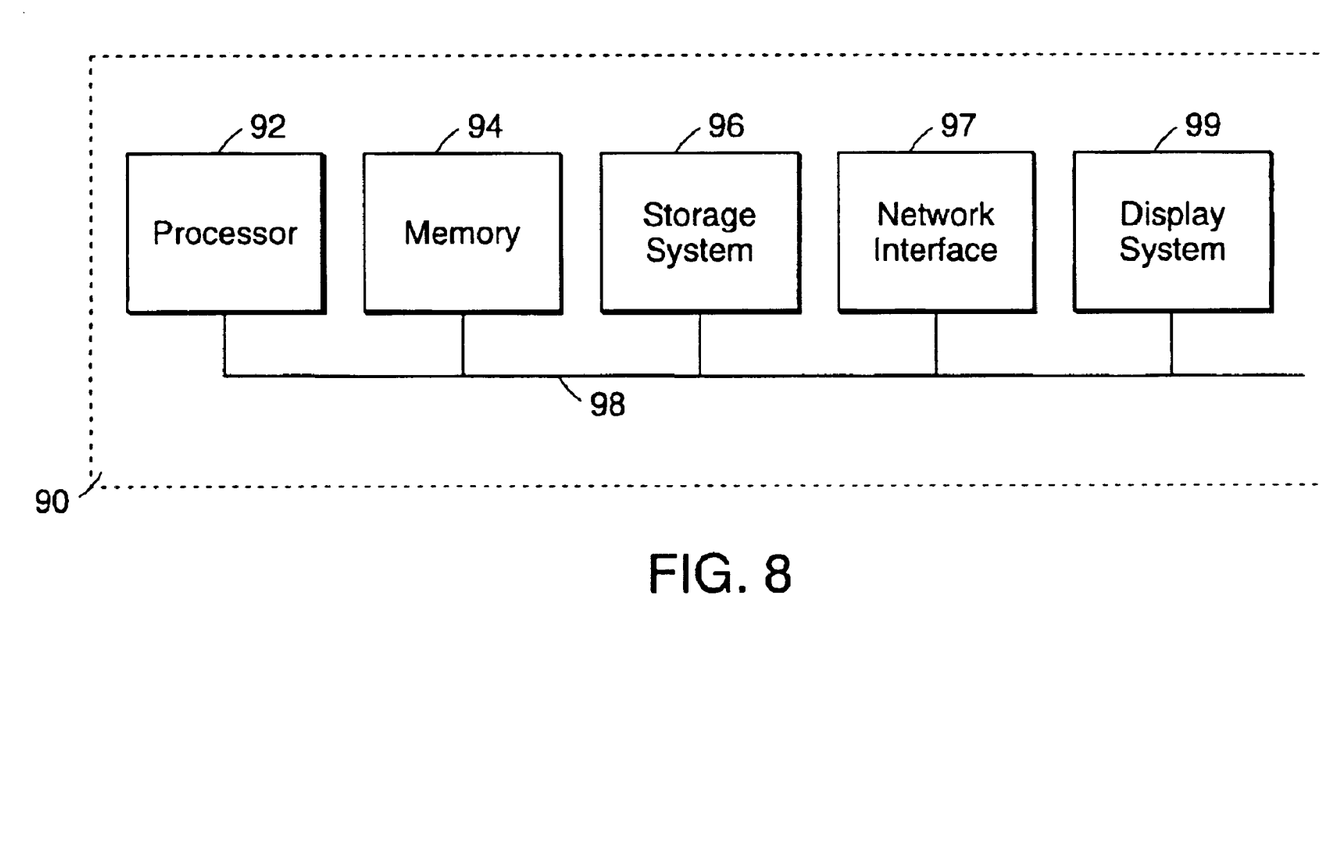
FIG. 8 is a diagram of a computer system suitable for use with the system and methods of the present invention.

Referring now to FIG. 8, a block diagram of a computer system suitable for use with the present invention is described. Computer system 90 includes at least processor 92 for processing information according to programmed instructions, and memory 94, for storing information and instructions for processor 92. Additionally, computer system 90 may optionally include storage system 96, such as a magnetic or optical disk system, for storing instructions and information on a relatively long-term basis. Computer system 90 also may include network interface 97, and display system 99, such as a video controller and monitor, on which information may be displayed. Processor 92, memory 94, storage system 96, network interface 97, and display system 99 are coupled to bus 98, which preferably provides a high-speed means for devices connected to bus 98 to communicate with each other.

It will be apparent to one of ordinary skill in the art that computer system 90 is illustrative, and that alternative systems and architectures may be used with the present invention. It will further be understood that many other devices, such as an audio output device (not shown), and a variety of other input and output devices (not shown), such as keyboards and mice, may be included in computer system 90. Computer system 90 may be a personal computer system, a workstation, a server, a supercomputer, a set-top box designed to be connected to a television or other similar display, a hand-held device, such as a cell phone or personal digital assistant, or any other device that contains a processor capable of executing programmed instructions and a memory capable of storing programmed instructions.

Those skilled in the art should readily appreciate that the programs defining the operations and methods defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

Conclusion

We have presented a capability format which improves upon prior formats by simultaneously providing four key features:

Address and bounds information are embedded directly in the capability representation.

A capability may point to an arbitrary word in its segment.

Internal fragmentation due to segment/object size mismatch is less than 6%; with a simple, high-locality allocation scheme, total fragmentation is less than 12%.

Objects of 32 or fewer words, e.g. most class instances in object-oriented systems, may be allocated with no fragmentation and will thus have precise hardware bounds-checking.

These features make it entirely practical to use a capability-guarded segment per allocated object, thus ensuring robust inter- and intra-program memory protection.

In addition to our basic capability format, we have described the implementation and application of increment-only pointers which enable precise hardware-only bounds-checking for Java-style objects/arrays. We have also demonstrated how to generate capabilities for sub-segments from which the enclosing segment can be recovered by system routines.

We should note that our capabilities may even be used with non-object-oriented code to improve software robustness. For instance, most programs written in C could run on our architecture; the malloc routine would return capabilities, and many classes of pointer-manipulation error traditionally undetected at the point of error would be caught by hardware bounds-checking.

Finally, for some applications our 128+1 bit capability format is unnecessarily large. A 64-bit encoding comprised of a 15 bounds-field, an increment-only bit, and a 48-bit address would provide several of the most important features of our format. Such an encoding might be particularly appealing for insuring intra-program data integrity in an environment in which inter-program integrity is provided by conventional disjoint virtual address spaces.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data processing system comprising:
   memory; and
   a pointer to a location in memory, the pointer comprising:
   a block field defining a block size;
   a length field defining a number of blocks in a segment of memory;
   an address pointing into the segment of memory;
   a finger field which denotes a block of the segment of memory into which the address points; and
   an increment-only bit which when set causes the system to exclude negative offsets to the address in the pointer.

2. A system as claimed in claim 1 wherein the address of the pointer to a location in memory points to the base address of a memory region within the segment, all portions of the memory segment not within the memory region having addresses less tan the address in the pointer to a location in memory.

3. A data processing system comprising:
   memory; and
   a pointer to a location in memory for each of a segment of memory and a
   subsegment within the segment of memory, the pointer comprising:
   a block field defining a block size;
   a length field defining a number of blocks in a segment of memory;
   an address pointing into the segment of memory; and
   a finger field which denotes a block of the segment of memory into which the address points.

4. A method of representing data in a data processing system comprising:
   defining a block size in a pointer to a location in memory;
   defining in the pointer to a location in memory a number of blocks in a segment of memory;
   defining in the pointer to a location in memory an address pointing into the segment of memory;
   defining in the pointer to a location in memory a block of the segment of memory into which the address points; and
   excluding negative offsets to the address in the memory representation where an increment-only bit is included in the pointer.

5. A method as claimed in claim 4 wherein the address of the pointer to a location in memory points to the base address of a memory region within the segment, all portions of the memory segment not within the memory region having addresses less than the address in the pointer to a location in memory.

6. A method of representing data in a data processing system comprising:
   defining a pointer to a location in memory for each of a segment of memory and a subsegment within the segment of memory;
   defining a block size in a pointer to a location in memory,
   defining in the pointer to a location in memory a number of blocks in a segment of memory;
   defining in the pointer to a location in memory an address pointing into the segment of memory; and
   defining in the pointer to a location in memory a block of the segment of memory into which the address points.

7. A computer program product comprising:
   a computer usable medium for storing data; and
   a set computer program instructions embodied on the computer usable medium, including a pointer to a location in memory, the pointer comprising:
   a block field defining a block size;
   a length field defining a number of blocks in a segment of memory;
   an address pointing into the segment of memory; and
   a finger field which denotes a block of the segment of memory into which the address points; and
   an increment-only bit which when set causes the system to exclude negative offsets to the address in the pointer to a location in memory.

8. A computer program product as claimed in claim 7 wherein the address of the pointer to a location in memory points to the base address of a memory region within the segment, all portions of the memory segment not within the memory region having addresses less than the address in the pointer to a location in memory.

9. A computer program product comprising:
   a computer usable medium for storing data; and
   a set of computer program instructions embodied on the computer usable medium, including a pointer to a location in memory for each of a segment of memory and a subsegment within the segment of memory, the pointer comprising:

a block field defining a block size;

a length field defining a number of blocks in a segment of memory;

an address pointing into the segment of memory; and a finger field which denotes a block of the segment of memory into which the address points.

10. A computer data signal comprising a pointer to a location in memory, the pointer comprising:

a block field defining a block size;

a length field defining a number of blocks in the segment of memory;

an address pointing into the segment of memory;

a finger field which denotes a block of the segment of memory into which the address points; and an increment-only bit which when set causes system to exclude negative offsets to the address in the pointer to a location in memory.

11. A computer data signal as claimed in claim 10 wherein the address of the pointer to a location in memory points to the base address of a memory region within the segment, all portions of the memory segment not within the memory region having addresses less than the address in the pointer to a location in memory.

12. A computer data signal comprising a pointer to a location in memory for each of a segment of memory and a subsegment within the segment of memory, the pointer comprising:

a block field defining a block size;

a length field defining a number of blocks in a segment of memory;

an address pointing into the segment of memory; and a finger field which denotes a block of the segment of memory into which the address points.

* * * * *

UNITED STATES PATENT AND TRADEMARK OFFICE
CERTIFICATE OF CORRECTION

PATENT NO.     : 6,826,672 B1
DATED          : November 30, 2004
INVENTOR(S)    : Jeremy H. Brown et al.

It is certified that error appears in the above-identified patent and that said Letters Patent is hereby corrected as shown below:

Title page,
Item [75], Inventors, delete middle initial "W." of "Andrew W. Huang" and add middle initial -- S. --

Column 11,
Line 64, delete "tan" and insert -- than --.

Column 12,
Line 2, there should be no line break after "a".
Line 46, after "set" insert -- of --.

Column 13,
Line 13, delete "the" before "segment" and insert -- a --.
Line 18, after "causes" insert -- the --.

Signed and Sealed this

Seventeenth Day of May, 2005

JON W. DUDAS
*Director of the United States Patent and Trademark Office*